United States Patent
Zhang et al.

(10) Patent No.: US 9,944,724 B2
(45) Date of Patent: Apr. 17, 2018

(54) ZIEGLER-NATTA CATALYSTS DOPED WITH NON-GROUP IV METAL CHLORIDES

(71) Applicant: FINA TECHNOLOGY, INC., Houston, TX (US)

(72) Inventors: Lei Zhang, League City, TX (US); David Knoeppel, League City, TX (US)

(73) Assignee: Fina Technology, Inc., Houston, TX (US)

( * ) Notice: Subject to any disclaimer, the term of this patent is extended or adjusted under 35 U.S.C. 154(b) by 56 days.

(21) Appl. No.: 15/171,105

(22) Filed: Jun. 2, 2016

(65) Prior Publication Data

US 2016/0272732 A1   Sep. 22, 2016

Related U.S. Application Data

(62) Division of application No. 13/028,393, filed on Feb. 16, 2011, now Pat. No. 9,382,347.

(51) Int. Cl.

| | |
|---|---|
| *C08F 4/06* | (2006.01) |
| *C08F 4/70* | (2006.01) |
| *C08F 4/80* | (2006.01) |
| *B01J 31/00* | (2006.01) |
| *B01J 37/00* | (2006.01) |
| *C08F 4/642* | (2006.01) |
| *C08F 10/00* | (2006.01) |
| *C08F 110/02* | (2006.01) |
| *C08F 10/02* | (2006.01) |

(52) U.S. Cl.
CPC ............ *C08F 4/6421* (2013.01); *C08F 10/00* (2013.01); *C08F 10/02* (2013.01); *C08F 110/02* (2013.01); *C08F 2410/03* (2013.01)

(58) Field of Classification Search
CPC ...... C08F 4/06; C08F 4/72; C08F 4/70; C08F 4/64; B01J 37/00; B01J 31/00
See application file for complete search history.

(56) References Cited

U.S. PATENT DOCUMENTS

| | | | | |
|---|---|---|---|---|
| 4,089,808 A | * | 5/1978 | Zucchini | ................. C08F 4/022 502/104 |
| 4,564,605 A | * | 1/1986 | Collomb-Ceccarini | ................ C08F 10/00 502/110 |
| 2007/0299224 A1 | * | 12/2007 | Vizzini | ................. B01J 31/122 526/176 |

\* cited by examiner

*Primary Examiner* — Robert Harlan
(74) *Attorney, Agent, or Firm* — Albert Shung

(57) ABSTRACT

A process may include contacting ethylene monomer with Ziegler-Natta catalyst to form polyethylene. The Ziegler-Natta catalyst may be formed by contacting an alkyl magnesium compound with an alcohol and a metal reagent to form a blend, and contacting the blend with a first agent to form a solution of reaction product "A". The solution of reaction product "A" may be contacted with a second agent to form a solid reaction product "B", and the solid reaction product "B" may be contacted with a third agent to form a solid reaction product "C". The solid reaction product "C" may be contacted with a fourth agent to form a solid reaction product "D", and the solid reaction product "D" may be contacted with a fifth agent to form a catalyst component.

13 Claims, 1 Drawing Sheet

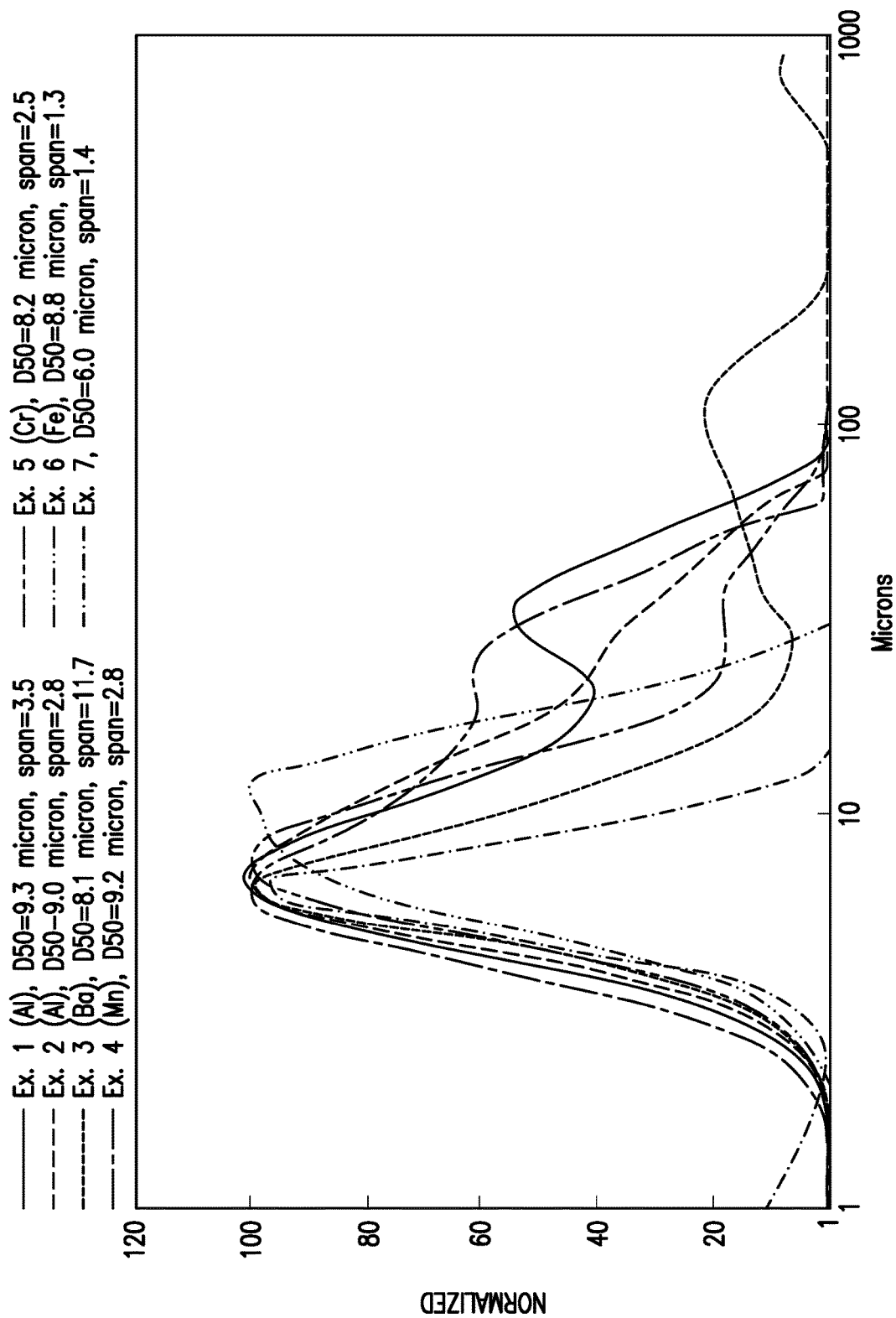

ZIEGLER-NATTA CATALYSTS DOPED WITH NON-GROUP IV METAL CHLORIDES

CROSS-REFERENCE TO RELATED APPLICATIONS

This application is a Divisional of U.S. patent application Ser. No. 13/028,393, filed on Feb. 16, 2011, the entirety of which is incorporated herein by reference.

FIELD

Embodiments of the present invention generally relate to Ziegler-Natta type catalysts and processes for forming Ziegler-Natta type catalyst systems.

BACKGROUND

Efforts are continuously underway to improve polymer properties via catalyst improvements. Accordingly, embodiments of the invention are directed towards modification of Ziegler-Natta type catalyst systems.

SUMMARY

Embodiments of the present invention include a process of forming a catalyst. The process generally includes contacting a metal component with a magnesium dihalide support material to form a Ziegler-Natta catalyst precursor; contacting the support material with a dopant including a non-Group IV metal halide to form a doped catalyst precursor; and activating the doped catalyst precursor by contact with an organoaluminum compound to form a Ziegler-Natta catalyst.

One or more embodiments include the process of the preceding paragraph, wherein forming the Ziegler-Natta catalyst precursor includes providing an alkyl magnesium compound; contacting the alkyl magnesium compound with an alcohol to form a magnesium dialkoxide compound; contacting the magnesium dialkoxide with a halogenating/titanating agent to form a reaction product "A"; contacting the reaction product "A" with a first metal halide/metal alkoxide blend to form a reaction product "13"; contacting the reaction product "B" with a second metal halide to form a reaction product "C"; and contacting the reaction product "C" with a third metal halide to form the Ziegler-Natta catalyst precursor.

One or more embodiments include the process of any preceding paragraph, wherein the forming a doped catalyst precursor comprises contacting the alkyl magnesium compound and the alcohol with the dopant.

One or more embodiments include the process of any preceding paragraph, wherein the dopant contacts the support material in an equivalent of from about 0.05 to about 0.15.

One or more embodiments include the process of any preceding paragraph, wherein the dopant is selected from AlEtCl$_2$ (ethylaluminum dichloride), Ba(2-EHO)$_2$ (barium (II) 2-ethyl hexyl alkoxide), Mn(2-ethylhexanoate)$_2$ (manganese(II) 2-ethylhexanoate), Cr(2-ethylhexanoate)$_3$ (chromium(III) 2-ethylhexanoate), 2-butylferrocene and combinations thereof.

One or more embodiments include the process of any preceding paragraph, wherein the alkyl magnesium compound is selected from butyl ethyl magnesium, diethyl magnesium, dipropyl magnesium, dibutyl magnesium and combinations thereof.

One or more embodiments include the process of any preceding paragraph, wherein the alcohol is selected from 2-ethylhexanol, butanol, isobutanol and combinations thereof.

One or more embodiments include the process of any preceding paragraph, wherein the halogenating/titanating agent is generally represented by the formula:

$Cl_xA(OR^4)_y$ wherein A is selected from titanium, silicon, aluminum, carbon, tin and germanium, $R^4$ is selected from $C_1$ to $C_{10}$ linear or branched alkyls comprising methyl, ethyl, propyl and isopropyl, x is 0 or 1, and y is the valence of A minus x.

One or more embodiments include the process of any preceding paragraph, wherein the halogenating/titanating agent is selected from chlorotitaniumtriisopropoxide (ClTi(O$^i$Pr)$_3$), chlorosiliconmethoxide (ClSi(Me)$_3$), titanium isopropoxide (Ti(O$^i$Pr)$_4$), and combinations thereof.

One or more embodiments include the process of any preceding paragraph, wherein the first metal halide/metal alkoxide blend is generally represented by the formula:

$TiCl_4/Ti(OR^5)_4$ wherein $R^5$ is selected from $C_2$ to $C_{20}$ alkyl groups.

One or more embodiments include the process of any preceding paragraph, wherein the first metal halide/metal alkoxide blend is selected from a titanium tetrachloride/tetra n-butyl titanate (TiCl$_4$/TNBT) blend, a titanium tetrachloride/titanium 2-ethylhexyl alkoxide blend and combinations thereof.

One or more embodiments include the process of any preceding paragraph, wherein the second metal halide is titanium tetrachloride (TiCl$_4$).

One or more embodiments include the process of any preceding paragraph, wherein the third metal halide is titanium tetrachloride (TiCl$_4$).

One or more embodiments include a polymerization process including providing ethylene monomer; contacting the ethylene monomer with the Ziegler-Natta catalyst of any preceding claim within a polymerization reactor under conditions sufficient to form polyethylene; and recovering polyethylene from the polymerization reactor.

One or more embodiments include the process of any preceding paragraph, wherein a shear response and activity for the polyethylene is greater than a shear response and activity for an identically formed polyethylene absent the dopant in the Ziegler-Natta catalyst.

One or more embodiments include the process of any preceding paragraph, wherein the polyethylene exhibits an SR2 of from about 30 to about 50.

One or more embodiments include the process of any preceding paragraph, wherein the polyethylene exhibits a Mz/Mw of from about 4.0 to about 9.0.

One or more embodiments include the process of any preceding paragraph, wherein the polymerization process exhibits an activity of from about 23,000 g/g/h to about 70,000 g/g/h.

One or more embodiments include a Ziegler-Natta catalyst formed by the process of any preceding paragraph.

One or more embodiments include polyethylene formed by the process of any preceding paragraph.

BRIEF DESCRIPTION OF DRAWINGS

FIG. 1 illustrates a graph of particle size distributions and particle sizes (D50) for certain Examples of Ziegler-Natta catalysts synthesized with non-group IV metal chloride dopants, as compared to an Example of a Ziegler-Natta catalyst synthesized with no dopant.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Ziegler-Natta catalyst systems generally utilize magnesium chloride as support material. Many efforts have been made to narrow the molecular weight distribution of polymers formed by the Ziegler-Natta catalysts systems with the goal to produce metallocene-like single-site type of catalysts, but little attention has been directed towards broadening of such. It is believed that a broadening in the molecular weight distribution, especially at the high molecular weight section can result in improved melt strength.

As used herein, the term "activity" refers to the weight of product produced per weight of the catalyst used in a process per hour of reaction at a standard set of conditions (e.g., grams product per grains catalyst per hour).

As used herein, the term "blend" refers to a mixture of compounds that are blended and/or mixed prior to contact with another compound.

As used herein, the term "catalyst support" refers to a solid crystalline material on which a Ziegler-Nana catalyst is deposited.

As used herein, the term "ethylene based polymers" is used interchangeably with the terms "ethylene polymer" or "polyethylene" and refers to a polymer having at least about 50 wt. % (weight percent), or at least about 70 wt. %, or at least about 75 wt. %, or at least about 80 wt. %, or at least about 85 wt. % or at least about 90 wt. % polyethylene relative to the total weight of polymer, for example.

As used herein, the term "equivalent" refers to a molar ratio of a component to a starting material, which as used herein, is either the alkyl magnesium compound or the magnesium dialkoxide compound, in some embodiments.

As used herein, the term "high load melt index" (HLMI) refers to a rate of flow of a molten polymer through an orifice of 0.0825 inch diameter when subjected to a force of 21.6 kg (kilograms) at 190° C. (degrees Celsius), and is measured via ASTM-D-1238-F.

As used herein, the term "medium density polyethylene" refers to ethylene based polymers having a density of from about 0.92 g/cc (gram per cubic centimeter) to about 0.94 g/cc or from about 0.926 g/cc to about 0.94 g/cc, for example.

As used herein, the term "high density polyethylene" refers to ethylene based polymers having a density of from about 0.94 g/cc to about 0.97 glee, for example.

As used herein, the term "molecular weight distribution" (MWD) refers to the ratio of Z average molecular weight to the weight average molecular weight (Mz/Mw) of a polymer.

As used herein, the term "particle size distribution" refers to a list of values or a mathematical function that defines the relative amounts of particles present, sorted according to size.

As used herein, the term "polymer density" refers to a measurement of the mass per unit volume of a polymer and is measured via ASTM-D-1238.

As used herein, the term "room temperature" includes a temperature of from about 20° C. to about 28° C. (68° F. (degrees Fahrenheit) to about 82° F.) However, room temperature measurements generally do not include close monitoring of the temperature of the process and therefore such a recitation does not intend to bind the embodiments described herein to any predetermined temperature range. Furthermore, a temperature difference of a few degrees does not matter to the phenomenon under investigation, such as a preparation method.

As used herein, the term "shear response (SR)" refers to a ratio of a high load melt index (see above) to a melt flow index (see above) of a polymer. SR2 is a ratio of a high load melt index to a melt flow index of MI2 (a rate of flow of a molten polymer through an orifice of 0.0825 inch diameter when subjected to a force of 2.16 kg (kilograms) at 190° C. (degrees Celsius), while SR5 is a ratio of a high load melt index to a melt flow index of MI5 (a rate of flow of a molten polymer through an orifice of 0.0825 inch diameter when subjected to a force of 5.0 kg (kilograms) at 190° C. (degrees Celsius).

As used herein, the term "solution" refers to a homogenous mixture of two or more compounds.

As used herein, the term "dopant" refers to metal halide added to a support material in a small amount (e.g., a molar equivalent of less than 0.5).

As used herein, the term "substituted" refers to an atom, radical or group that replaces a hydrogen in a chemical compound.

Catalyst Systems

Ziegler-Natta catalyst systems are generally formed from the combination of a metal component (e.g., a catalyst precursor) with one or more additional components, such as a catalyst support, a cocatalyst and/or one or more electron donors, for example.

A specific example of a Ziegler-Nana catalyst includes a metal component generally represented by the formula:

$$MR^A{}_x;$$

wherein M is a transition metal, $R^A$ is a halogen, an alkoxy or a hydrocarboxyl group, and x is the valence of the transition metal. For example, x may be from 1 to 4.

The transition metal may be selected from Groups IVB through VIB (e.g., titanium, vanadium or chromium), for example. $R^4$ may be selected from chlorine, bromine, carbonates, esters or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst." Embodiments of such Z-N activators include organoaluminum compounds, such as triethyl aluminum (TEM), trimethyl aluminum (TMA) and triisobutyl aluminum (TIBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene solubles in the polymer. The internal electron donors may include amines, amides, esters, ketones, nitriles, ethers, phosphines, diethers, succinates, phthalates or dialkoxybenzenes, for example. (See, U.S. Pat. No. 5,945,366 and U.S. Pat. No. 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CDMS), diisopropyldimethoxysilane and/or dicyclopentyldimethoxysilane (CPDS), for, example. The external donor may be the same or different from the internal electron donor used.

The components of the Ziegler-Natta catalyst system (e.g., catalyst, activator and/or electron donors) may or may not be associated with a catalyst support, either in combination with each other or separate from one another. The catalyst support can be an inert solid which is chemically unreactive with any of the components of the conventional Ziegler-Natta catalyst. The Ziegler-Natta catalyst support materials may include a magnesium dihalide, such as magnesium dichloride or magnesium dibromide, or silica, for example.

Prior efforts to form active Ziegler-Natta catalysts generally include those described in U.S. Pat. No. 6,734,134 and U.S. Pat. No. 6,174,971, which are incorporated by reference herein.

Many known processes for forming Ziegler-Natta catalyst systems utilize a catalyst support in the form of a solid crystalline material, such as a magnesium compound, on which the Ziegler-Natta catalyst is deposited. Magnesium chloride ($MgCl_2$) has been found desirable and attempts to replace magnesium chloride ($MgCl_2$) with other structurally similar metal halides, such as aluminum chloride ($AlCl_3$) and manganese chloride ($MnCl_2$), have resulted in a decrease, and even complete loss, in productivity. However, rather than replacing the magnesium chloride support, the embodiments described herein dope (e.g., adding a small amount of a metal halide to the magnesium chloride support) the support with structurally similar metal halides, leading to an actual increase in catalyst activity.

The dopant generally is selected from non-Group IV metal halides. For example, the dopant may include a non-Group IV metal chloride. Non-limiting illustrations of non-group IV metal chlorides include $AlEtCl_2$ (ethylaluminum dichloride), $Ba(2-EHO)_2$ (barium(II) 2-ethyl hexyl alkoxide), $Mn(2-ethylhexanoate)_2$ (manganese(II) 2-ethyl-hexanoate), $Cr(2-ethylhexanoate)_3$ (chromium(III) 2-ethyl-hexanoate), and 2-butylferrocene, for example.

The dopant may contact the support material in an equivalent of from about 0.05 to about 0.5, or from about 0.075 to about 0.25 or from about 0.1 to about 0.15, for example.

Unexpectedly, it has been observed that doped catalysts may form a polymer having a higher shear response than a reference non-doped catalyst formed polymer. In one or more embodiments, the formed polymers may have an SR2 (HLMI/MI2) of from about 25 to about 75, or from about 30 to about 50 or from about 30 to about 45, for example.

It has further been observed that the doped supports are capable of broadening the molecular weight distribution (Mz/Mw) of the formed polymers. For example, the formed polymers may exhibit a molecular weight distribution (Mz/Mw) of from about 4 to about 10, or from about 4.0 to about 9, for example.

A representative, non-limiting, illustration of a possible reaction scheme for used with embodiments is illustrated below. However, it is to be noted that while illustrated as contacting the support material in the first stemp, it is contemplated that the dopant may contact the support at any step during the catalyst synthesis.

1) $MgR^1R^2 + R^3OH + M\text{-reagent} \rightarrow Mg(OR^3)_2/M$
2) $Mg(OR^3)_2/M + Cl_xA(OR^4)_y \rightarrow$ "A"
3) "A" + $TiCl_4/Ti(OR^5)_4 \rightarrow$ "B"
4) "B" + $TiCl_4 \rightarrow$ "C"
5) "C" + $TiCl_4 \rightarrow$ "D"
6) "D" + $AlR^6_3 \rightarrow$ Catalyst Note that while the primary reaction components are illustrated above, additional components may be reaction products, or used in such reactions, and not illustrated above. Further, while described herein in terms of primary reaction steps, it is known to those skilled in the art that additional steps may be included in the reaction schemes and processes described herein (e.g., washing, filtering, drying or decanting steps), while it is further contemplated that other steps may be eliminated in certain embodiments. In addition, it is contemplated that any of the agents described herein may be added in combination with one another so long as the order of addition complies with the spirit of the invention.

The catalyst synthesis method illustrated above generally includes contacting an alkyl magnesium compound with an alcohol to form a magnesium dialkoxide compound/metal blend. Such reaction may occur at a reaction temperature ranging from room temperature to about 90° C. for a time of up to about 10 hours, for example.

As illustrated above, the alkyl magnesium compound and the alcohol may further be contacted with a metal reagent (M-reagent). The metal reagent is the dopant described previously herein.

The alcohol may be added to the alkyl magnesium compound in an equivalent of from about 0.5 to about 6, or from about 1 to about 3, for example.

The alkyl magnesium compound may generally be represented by the following formula (I):

$$MgR^1R^2; \qquad (I)$$

wherein $R^1$ and $R^2$ are independently selected from $C_1$ to $C_{10}$ alkyl groups. Non-limiting illustrations of alkyl magnesium compounds include butyl ethyl magnesium (BEM), diethyl magnesium, dipropyl magnesium and dibutyl magnesium, for example.

The alcohol may generally be represented by the formula (II):

$$R^3OH; \quad (II)$$

wherein $R^3$ is selected from $C_2$ to $C_{20}$ linear or branched alkyl groups. Non-limiting illustrations of alcohols generally include 2-ethylhexanol, butanol and isobutanol, for example.

The metal may generally be represented by the formula (III):

$$M; \quad (III)$$

wherein M is selected from non-group IV metal ions. Non-limiting illustrations of non-group IV metals include $Al^{3+}$ (aluminum ion), $Cr^{3+}$ (chromium ion), $Fe^{2+}$ (iron ion), $Mn^{2+}$ (manganese ion) and $Ba^{2+}$ (barium ion).

The method may then include contacting the magnesium dialkoxide compound/metal blend with a first agent to form a reaction product "A", such as a solution of reaction product "A".

Such reaction may occur in the presence of an inert solvent. A variety of hydrocarbons can be used as the inert solvent, but any hydrocarbon selected should remain in liquid form at all relevant reaction temperatures, and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, or combinations thereof, for example.

The reaction may further occur at a temperature of from about 0° C. to about 100° C., or from about 20° C. to about 90° C., for a time of from about 0.2 hours to about 24 hours, or from about 1 hour to about 4 hours, for example.

The first agent may generally be represented by the following formula (IV):

$$Cl_xA(OR^4)_y; \quad (IV)$$

wherein A is selected from titanium, silicon, aluminum, carbon, tin and germanium, $R^4$ is selected from $C_1$ to $C_{10}$ linear or branched alkyls, such as methyl, ethyl, propyl and isopropyl, x is 0 or 1, and y is the valence of A minus x. Non-limiting illustrations of first agents include halogenatating/titanating agents, such as chlorotitaniumtriisopropoxide (ClTi(O$^i$Pr)$_3$), chlorosiliconmethoxide (ClSi(Me)$_3$), titanium isopropoxide (Ti(O$^i$Pr)$_4$) and combinations thereof, for example.

The method further includes contacting reaction product "A", such as the solution of reaction product "A", with a second agent to form a reaction product "B", such as a solid reaction product "B". The second agent may generally be represented by the following formula (V):

$$TiCl_4/Ti(OR^5)_4; \quad (V)$$

wherein $R^5$ is selected from $C_2$ to $C_{20}$ alkyl groups. Non-limiting illustrations of second agents include blends of titanium chloride and titanium alkoxides, such as titanium tetrachloride/tetra n-butyl titanate (TiCl$_4$/TNBT), titanium tetrachloride/titanium 2-ethylhexyl alkoxide and combinations thereof, for example. The blends may have an equivalent of TiCl$_4$:Ti(OR$^5$)$_4$ of from about 0.5 to about 6, or from about 2 to about 3, for example.

Such reaction may occur in the presence of an inert solvent. The inert solvents may include any of those solvents previously discussed herein, for example.

The method further includes contacting reaction product "B", such as the solid reaction product "B", with a third agent to form a reaction product "C", such as a solid reaction product "C". Such reaction may occur in the presence of an inert solvent such as hexane. Alternatively, the inert solvent may include any of those solvents previously discussed herein, for example. The reaction may further occur at room temperature, for example.

Non-limiting illustrations of third agents include metal halides. The metal halides may include any metal halide known to one skilled in the art, such as titanium tetrachloride (TiCl$_4$), for example. The third agent may be added in a equivalent of from about 0.1 to about 5, or from about 0.25 to about 4, or from about 0.45 to about 2.5, for example.

The method may further include contacting reaction product "C", such as the solid reaction product "C", with a fourth agent to form a reaction product "D", such as a solid reaction product "D". Such reaction may occur in the presence of an inert solvent such as hexane. Alternatively, the inert solvent may also include any of those solvents previously discussed herein, for example. The reaction may further occur at room temperature, for example.

Non-limiting illustrations of fourth agents include metal halides. The metal halides may include any metal halide known to one skilled in the art, such as titanium tetrachloride (TiCl$_4$), for example. The third agent may be added in a equivalent of from about 0.1 to about 5, or from about 0.25 to about 4 or from about 0.45 to about 2.5, for example.

The method may further include contacting reaction product "D", such as the solid reaction product "D", with a fifth agent to form a catalyst component. The fifth agent may be selected from organolithium compounds, organomagnesium compounds, organoaluminum compounds and combinations thereof, for example.

The fifth agent may be added to the reaction product "D" in an equivalent of from about 0.1 to about 1.0, or from 0.1 to about 0.5, for example.

Non-limiting illustrations of fifth agents include organoaluminum compounds. The organoaluminum compounds may include aluminum alkyls having the following formula (VI):

$$AlR^6_3; \quad (VI)$$

wherein $R^6$ is a $C_1$ to $C_{10}$ alkyl compound. Non-limiting illustrations of the aluminum alkyl compounds generally include triethyl aluminum (TEAl), trimethyl aluminum (TMA), triisobutyl aluminum (TIBAl), n-octyl aluminum and n-hexyl aluminum, for example.

In one or more embodiments, the catalyst has an average particle size in a range of from about 5 microns to about 10 microns, or from about 6.0 microns to about 9.5 microns, for example.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525, 678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig (pound-force per square inch gauge), or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In a specific embodiment, a slurry process or a bulk process may be carried out continuously (in series, parallel or combinations thereof) in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

Alternatively, other types of polymerization processes may be used, such stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene (e.g., syndiotactic, atactic and isotactic) and polypropylene copolymers, for example.

Unless otherwise designated herein, all testing methods are the current methods at the time of filing.

In one or more embodiments, the polymers include ethylene based polymers.

The ethylene based polymers may have a density (as measured by ASTM-D-792) of from about [0.86 g/cc to about 0.98 g/cc, or from about 0.88 glee to about 0.965 g/cc, or from about 0.90 glee to about 0.965 glee, or from about 0.925 glee to about 0.97 g/cc, for example].

The ethylene based polymers may have a melt flow index, ($MI_2$) (as measured by ASTM-D-1238-E) of from about 0.01 dg/min. to about 100 dg/min., or from about 0.01 dg/min. to about 25 dg/min., or from about 0.03 dg/min. to about 15 dg/min., or from about 0.05 dg/min. to about 10 dg/min., for example, or from about 0.10 dg/min to about 0.90 dg/min., for example.

The ethylene based polymers may have a melt flow index ($MI_5$) (as measured by ASTM-D-1238-E) of from about 0.1 dg/min. to about 3.0 dg/min., or from about 0.1 dg/min. to about 2.9 dg/min., or from about 0.2 dg/min. to about 2.9 dg/min., for example.

The ethylene based polymers may have a Mn of from about 15,000 to about 75,000, or from about 20,000 to about 50,000, for example.

The ethylene based polymers may have a Mw of from about 100,000 to about 350,000, or from about 130,000 to about 300,000, for example.

The ethylene based polymers may have a Mz of from about 500,000 to about 3,000,000, or from about 600,000 to about 2,600,000, for example.

The ethylene based polymers may have a melt strength of from about 6.5 cN (centinewton) to about 11 cN, or from about 7 cN to about 11 cN, or from about 7 cN to about 10 cN, for example.

In one or more embodiments, the polymers include low density polyethylene.

In one or more embodiments, the polymers include linear low density polyethylene.

In one or more embodiments, the polymers include medium density polyethylene.

In one or more embodiments, the polymers include high density polyethylene.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

In one or more embodiments, the polymers are useful for film applications.

In one or more embodiments, the polymers are useful for blow molding applications.

EXAMPLES

A group of non-group IV metal chlorides (metal=$Al^{3+}$, $Cr^{3+}$, $Fe^{2+}$, $Mn^{2+}$ and $Ba^{2+}$) were used as dopants for catalyst syntheses and their effects on catalyst performance and polymer properties were investigated.

Examples 1-7 for Ziegler-Natta catalyst compounds were prepared in a 500 mL (milliliter) reactor equipped with four Morten's indentions and a dropping funnel, an overhead agition system having a metal shaft with two three-blades impellers and septa.

As used herein, "BEM" refers to 20.2 wt. % solution of butyl ethyl magnesium (0.12 wt. % Al in the form of TEAL as viscosity modifier).

As used herein, "TEAl" refers to triethyl aluminum.
As used herein, "2-EHOH" refers to 2-ethylhexanol.
As used herein, "M-reagent" refers to metal reagent.
As used herein, "M" refers to metal.
As used herein, "TNBT" refers to tetra n-butyl titanate.
As used herein, "$TiCl_4$" refers to titanium tetrachloride.

Examples 1 and 3-6 of the Ziegler-Natta catalyst compounds were synthesized and prepared using the following reaction scheme:

1) BEM+2.2 equiv. 2-ethylhexanol (2-EHOH)+0.10 equiv. M-reagent→$Mg(2\text{-}EHO)_2$/M
2) $Mg(2\text{-}EHO)_2$/M+$ClTi(O^iPr)_3$→Solution A
3) Solution A+$TiCl_4$/TNBT→Solid B
4) Solid B+$TiCl_4$→Solid C
5) Solid C+$TiCl_4$→Solid D
6) Solid D+0.16 equiv. TEAl→Catalyst Example 2 of the Ziegler-Natta catalyst compounds was synthesized and prepared using the identical above reaction scheme as Examples 1 and 3-6, except that for step 2), $Ti(O^iPr)_4$ was used instead of $ClTi(O^iPr)_3$.

Example 7 of the Ziegler-Natta catalyst compounds was synthesized using the above identical reaction scheme as Examples 1 and 3-6, except that for step 1), no 0.10 equiv. M-reagent was used and only $Mg(2\text{-}EHO)_2$ resulted from step 1) and not an $Mg(2\text{-}EHO)_2$/M blend.

Table 1 below illustrates the metals and metal reagents (M-reagent) added during the synthesis of the Ziegler-Natta catalyst intermediate compounds in Examples 1-6. Table 1 illustrates that no metal or metal reagent was added during the synthesis of the Ziegler-Natta catalyst intermediate compounds in Example 7.

TABLE 1

| Catalysts | Ex. 1 | Ex. 2 | Ex. 3 | Ex. 4 | Ex. 5 | Ex. 6 | Ex. 7 |
|---|---|---|---|---|---|---|---|
| Metal | $Al^{3+}$ | $Al^{3+}$ | $Ba^{2+}$ | $Mn^{2+}$ | $Cr^{3+}$ | $Fe^{2+}$ | None |
| M-reagent | $AlEtCl_2$ | $AlEtCl_2$ | $Ba(2\text{-}EHO)_2$ | $Mn(2\text{-ethylhexanoate})_2$ | $Cr(2\text{-ethylhexanoate})_3$ | 2-butylferrocene | None |

In synthesizing and preparing examples 1-7 of the Ziegler-Natta catalyst compounds, in step 1), 20 mmol (millimole) (10.94 g (gram)) of BEM were slurried in hexane (total volume 20 mL) and the mixture was stirred (250 rpm (revolutions per minute)) at room temperature. In addition, 2.2 equiv. 2-EHOH (43 mmol or 5.64 g) was slurried in 10 mL of hexane and the resulting solution was added dropwise to the BEM solution at room temperature over 10 minutes. In addition, 0.10 equiv. of an M-reagent (the M-reagent for each Example 1-6 shown in Table 1), was added to each of the mixtures for Examples 1-6. No M-reagent was added to the mixture for Example 7. The resulting reaction mixtures for Examples 1-7 were then stirred at room temperature for another hour.

For Examples 1 and 3-7, the preparation then included step 2) of adding 20 mmol of a first agent of chlorotitaniumtriisopropoxide ($ClTi(O^iPr)_3$) (1M in hexane) to the magnesium dialkoxide ($Mg(2\text{-}EHO)_2$)/M (metal) blend (Examples 1 and 3-6) or to the magnesium dialkoxide ($Mg(2\text{-}EHO)_2$ (Example 7) at room temperature over 10 minutes. For Example 2, the preparation then included step 2) of adding 10 mL hexane solution of 20 mmol (0.57 g) of a first agent of $Ti(O^iPr)_4$ (titanium isopropoxide) to the magnesium dialkoxide ($Mg(2\text{-}EHO)_2$)/M (metal) blend at room temperature over 10 minutes. For Examples 1-7, a clear, solid-free solution of reaction product or mixture "A" was obtained. The solution of reaction product or mixture "A" was then stirred at room temperature for another hour.

The preparation then included step 3) of adding a 60 mL hexane solution of a second agent of titanium tetrachloride/tetra n-butyl titanate ($TiCl_4$/TNBT, TiCl4=7.6 g, 40 mmol and TNBT=6.88 g, 20 mmol) to the solution of reaction product or mixture "A" over one hour to obtain a solid reaction product or mixture "B". The mixture "B" was then stirred at room temperature for one hour. The solid reaction product or mixture "B" was then decanted and the resulting solids were washed three times with 40 mL of hexane. The solids were then suspended in 20 mL of hexane.

The preparation then included step 4) of adding 20 mmol (3.8 g) of a third agent of titanium tetrachloride ($TiCl_4$) (diluted to 10 mL in hexane) dropwise to the reaction product or mixture "B" at room temperature over 5 minutes to form a solid reaction product or mixture "C". The solid reaction product or mixture "C" was then stirred at room temperature for another hour. The solid reaction product or mixture "C" was then decanted and the solids were washed with one wash of 40 mL of hexane. The solids were then suspended in 20 mL of hexane.

The preparation then included step 5) of adding 20 mmol (3.8 g) of a fourth agent of titanium tetrachloride ($TiCl_4$) (diluted to 10 mL in hexane) dropwise to the reaction product or mixture "C" at room temperature over 5 minutes to form a solid reaction product or mixture "D". The solid reaction product or mixture "D" was then stirred at room temperature for another hour. The solid reaction product or mixture "D" was then decanted and the solids were washed three times with 40 mL of hexane. The solids were then suspended in 20 mL of hexane.

The preparation then included step 6) of adding 3.2 mmol (1.48 g) of a fifth agent of 0.16 equiv. triethyl aluminum (TEAl) to the reaction product or mixture "D" at room temperature over 5 minutes to form the final catalyst. The final catalyst compound was then stirred at room temperature for another hour.

Polymerizations with the synthesized Ziegler-Natta catalysts were performed at the following conditions: hexane as diluent, $C_2$=8 SLPM (standard liters per minute), $H_2/C_2$ feed ratio=0.25, 125 psig (pound-force per square inch gauge), 80° C., [TIBAl (triisobutyl aluminum)]=0.25 mmol/L (millimol per liter) and 1 hour. The polymerization results for Examples 1-7 are summarized in Table 2 below.

catalyst Example 7. As shown in Table 2, all of the non-group IV metal chloride doped catalyst Examples 1-6 had a lower bulk density (B.D. (g/mL)) than non-doped catalyst Example 7. As shown in Table 2, the hydrogen responses of $Al^{3+}$ modified catalyst Example 2 and $Fe^{2+}$ modified catalyst Example 6 were higher when compared to non-doped catalyst Example 7. As shown in Table 2, the shear responses for SR5 ($HLMI/MI_5$) were similar for non-group IV metal chloride doped catalyst Examples 1-6 and non-doped catalyst Example 7. As shown in Table 2, the shear responses for SR2 ($HLMI/MI_5$) for non-group IV metal chloride doped catalyst Examples 1-6 were all higher than non-doped catalyst Example 7. Despite the improved shear thinning of the non-group IV metal chloride doped catalyst Examples 1-6, the molecular weight distributions (MWD (Mw/Mn) were narrower than non-doped catalyst Example 7, thus indicating the possible existence of long chain branching. Moreover, Example 1 and 5 displayed a broader Mz/Mw than non-doped catalyst Example 7, suggesting improved melt strength of Example 1 and 5 versus Example 7. Higher polymer melt strength is desirable in many applications, such as to alleviate pipe-sagging or to improve film strength for film thickness downgauging.

FIG. 1 illustrates a graph of particle size distributions and particle sizes (D50) for certain Examples of Ziegler-Natta catalysts synthesized with non-group IV metal chloride dopants, as compared to an Example of a Ziegler-Natta catalyst synthesized with no dopant. In particular, FIG. 1 illustrates a graph of particle size distributions for non-group IV metal chloride doped catalyst Example 1, Example 2, Example 3, Example 4, Example 5, and Example 6, as compared to a non-doped catalyst Example 7. As shown in FIG. 1, non-group IV metal chloride doped catalyst Examples 1-6 had broader particle size distributions and larger D50's (particle size) as compared to the non-doped catalyst Example 7. The bimodal distribution of non-group IV metal chloride doped catalyst Example 1 was due to premature precipitation before $TiCl_4$/TNBT addition, while non-group IV metal chloride doped catalyst Example 3, Example 4, and Example 5 could be attributed to inhomo-

TABLE 2

| Catalysts | Ex. 1 | Ex. 2 | Ex. 3 | Ex. 4 | Ex. 5 | Ex. 6 | Ex. 7 |
|---|---|---|---|---|---|---|---|
| Metal | $Al^{3+}$ | $Al^{3+}$ | $Ba^{2+}$ | $Mn^{2+}$ | $Cr^{3+}$ | $Fe^{2+}$ | None |
| B.D. (g/mL) | 0.32 | 0.34 | 0.29 | 0.34 | 0.26 | 0.27 | 0.38 |
| Mg based Activity (g/g/h) | 50,000 | 66,000 | 25,000 | 36,000 | 30,000 | 47,000 | 20,000 |
| $MI_2$ (dg/min) | 0.56 | 0.89 | 0.15 | 0.18 | 0.07 | 0.76 | 0.62 |
| $MI_5$ (dg/min) | 1.71 | 2.88 | 0.49 | 0.77 | 0.24 | 2.32 | 1.84 |
| HLMI (dg/min) | 19.2 | 32.9 | 5.6 | 8.0 | 2.5 | 24.1 | 19.4 |
| SR2 ($HLMI/MI_2$) | 34.3 | 37.0 | 37.3 | 44.4 | 35.7 | 31.7 | 31.3 |
| SR5 ($HLMI/MI_5$) | 11.2 | 11.4 | 11.4 | 10.4 | 10.4 | 10.4 | 10.5 |
| Wax (%) | 0.1 | NA | NA | NA | NA | NA | 0.3 |
| Mn (g/mol) | 23,000 | 20,000 | 34,000 | 30,000 | 46,000 | 23,000 | 21,000 |
| Mw (g/mol) | 159,000 | 124,000 | 209,000 | 177,000 | 291,000 | 137,000 | 163,000 |
| Mz (g/mol) | 1,008,000 | 602,000 | 846,000 | 708,000 | 2,600,000 | 635,000 | 930,000 |
| MWD (Mw/Mn) | 6.8 | 6.2 | 6.1 | 5.9 | 6.3 | 6.1 | 7.7 |
| MWD (Mz/Mw) | 6.3 | 4.9 | 4.0 | 4.0 | 8.9 | 4.6 | 5.7 |
| Density (g/mL) | 0.957 | 0.956 | 0.955 | NA | 0.954 | 0.960 | 0.960 |

As shown in Table 2, all of the non-group IV metal chloride doped catalyst Examples 1-6 had a higher Mg (magnesium) based activity (Activity g/g/h) than non-doped geneous incorporation of non-group IV metal chlorides doped in the magnesium chloride (MgCl$_2$) support, indicating the possible existence of different supporting environments.

While the foregoing is directed to embodiments of the present invention, other and further embodiments of the invention may be devised without departing from the basic scope thereof and the scope thereof is determined by the claims that follow.

What is claimed is:

1. A polymerization process comprising:
providing ethylene monomer;
contacting the ethylene monomer with a Ziegler-Natta catalyst within a polymerization reactor under conditions sufficient to form polyethylene; and
recovering polyethylene from the polymerization reactor, wherein the Ziegler-Natta catalyst is formed by a process comprising:
contacting an alkyl magnesium compound with an alcohol and a metal reagent to form a blend of a magnesium dialkoxide compound and a metal;
contacting the blend of the magnesium dialkoxide compound and the metal with a first agent to form a solution of reaction product "A", the first agent comprising a halogenating/titanating agent;
contacting the solution of reaction product "A" with a second agent to form a solid reaction product "B", the second agent comprising a blend of a first metal halide and a metal alkoxide;
contacting the solid reaction product "B" with a third agent to form a solid reaction product "C", the third agent comprising a second metal halide;
contacting the solid reaction product "C" with a fourth agent to form a solid reaction product "D", the fourth agent comprising a third metal halide; and
contacting the solid reaction product "D" with a fifth agent to form a catalyst component, the fifth agent comprising an organoaluminum compound;
wherein the metal reagent is selected from Ba(2-EHO)$_2$ (barium(II) 2-ethyl hexyl alkoxide), Mn(2-ethylhexanoate)$_2$ (manganese(II) 2-ethylhexanoate), Cr(2-ethylhexanoate)$_3$ (chromium(III) 2-ethylhexanoate) and 2-butylferrocene.

2. The process of claim 1, wherein a shear response and activity for the polyethylene is greater than a shear response and activity for an identically formed polyethylene absent the metal reagent in the Ziegler-Natta catalyst.

3. The process of claim 1, wherein the polyethylene exhibits an SR2 of from about 30 to about 50.

4. The process of claim 1, wherein the polyethylene exhibits a Mz/Mw of from about 4.0 to about 9.0.

5. The process of claim 1, wherein the polymerization process exhibits an activity of from about 23,000 g/g/h to about 70,000 g/g/h.

6. Polyethylene formed by the process of claim 1.

7. A polymerization process comprising:
providing ethylene monomer;
contacting the ethylene monomer with a Ziegler-Natta catalyst within a polymerization reactor under conditions sufficient to form polyethylene; and
recovering polyethylene from the polymerization reactor, wherein the Ziegler-Natta catalyst is formed by a process comprising:
contacting an alkyl magnesium compound with an alcohol and a metal reagent to form a blend of a magnesium dialkoxide compound and a metal;
contacting the blend of the magnesium dialkoxide compound and the metal with a first agent to form a solution of reaction product "A", the first agent comprising a halogenating/titanating agent;
contacting the solution of reaction product "A" with a second agent to form a solid reaction product "B", the second agent comprising a blend of a first metal halide and a metal alkoxide;
contacting the solid reaction product "B" with a third agent to form a solid reaction product "C", the third agent comprising a second metal halide;
contacting the solid reaction product "C" with a fourth agent to form a solid reaction product "D", the fourth agent comprising a third metal halide; and
contacting the solid reaction product "D" with a fifth agent to form a catalyst component, the fifth agent comprising an organoaluminum compound;
wherein the metal in the metal reagent is selected from Cr$^{3+}$, Fe$^{2+}$, Mn$^{2+}$, and Ba$^{2+}$.

8. A polymerization process comprising:
providing ethylene monomer;
contacting the ethylene monomer with a Ziegler-Natta catalyst within a polymerization reactor under conditions sufficient to form polyethylene; and
recovering polyethylene from the polymerization reactor, wherein the Ziegler-Natta catalyst is formed by a process comprising:
contacting a metal component with a magnesium dihalide support material to form a Ziegler-Natta catalyst precursor, wherein the metal component is represented by the formula:

MR$^4_x$ wherein M is a transition metal; wherein R$^4$ is a halogen, an alkoxy, or a hydrocarboxyl group; and wherein x is the valence of M;
contacting the magnesium dihalide support material in the Ziegler-Natta catalyst precursor with a dopant comprising a non-Group IV metal to form a doped catalyst precursor; and
activating the doped catalyst precursor by contact with an organoaluminum compound to form the Ziegler-Natta catalyst;
wherein the dopant is selected from Ba(2-EHO)$_2$ (barium (II) 2-ethyl hexyl alkoxide), Mn(2-ethylhexanoate)$_2$ (manganese(II) 2-ethylhexanoate), Cr(2-ethylhexanoate)$_3$ (chromium(III) 2-ethylhexanoate), 2-butylferrocene and combinations thereof.

9. The process of claim 8, wherein a shear response and activity for the polyethylene is greater than a shear response and activity for an identically formed polyethylene absent the dopant in the Ziegler-Natta catalyst.

10. The process of claim 8, wherein the polyethylene exhibits an SR2 of from about 30 to about 50.

11. The process of claim 8, wherein the polyethylene exhibits a Mz/Mw of from about 4.0 to about 9.0.

12. The process of claim 8, wherein the polymerization process exhibits an activity of from about 23,000 g/g/h to about 70,000 g/g/h.

13. Polyethylene formed by the process of claim 8.

* * * * *